United States Patent
Huang et al.

(10) Patent No.: US 12,368,209 B2
(45) Date of Patent: Jul. 22, 2025

(54) END COVER ASSEMBLY, BATTERY CELL, BATTERY AND ELECTRIC DEVICE

(71) Applicant: CONTEMPORARY AMPEREX TECHNOLOGY (HONG KONG) LIMITED, Hong Kong (CN)

(72) Inventors: Shoujun Huang, Ningde (CN); Yanyu Liu, Ningde (CN); Xinxiang Chen, Ningde (CN); Yulian Zheng, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 592 days.

(21) Appl. No.: 17/701,905

(22) Filed: Mar. 23, 2022

(65) Prior Publication Data
US 2022/0384904 A1 Dec. 1, 2022

Related U.S. Application Data

(63) Continuation of application No. PCT/CN2021/097604, filed on Jun. 1, 2021.

(51) Int. Cl.
*H01M 50/325* (2021.01)
*H01M 10/04* (2006.01)

(52) U.S. Cl.
CPC ......... *H01M 50/325* (2021.01); *H01M 10/04* (2013.01); *H01M 2220/20* (2013.01)

(58) Field of Classification Search
None
See application file for complete search history.

(56) References Cited

U.S. PATENT DOCUMENTS 6,521,024 B1 * 2/2003 Akahori ............ H01M 50/3425
96/6
2013/0032219 A1 2/2013 Heim et al.
(Continued)

FOREIGN PATENT DOCUMENTS

CA 2503505 A1 5/2004
CN 109904367 A 6/2019
(Continued)

OTHER PUBLICATIONS

CN110400895A_Machine translation (Year: 2019).*
(Continued)

*Primary Examiner* — Jonathan G Leong
*Assistant Examiner* — Aryana Y. Ortiz
(74) *Attorney, Agent, or Firm* — Scully, Scott, Murphy & Presser, P.C.

(57) ABSTRACT

The present application provides an end cover assembly, a battery cell, a battery, an electric device and a method for preparing a battery cell and an apparatus for manufacturing a battery cell. The present application provides an end cover assembly, where the end cover assembly includes: a cover plate provided with a pressure relief hole; a fixing member fixed on the cover plate, the fixing member having a first through hole and a second through hole, and the first through hole being opposite to the pressure relief hole; and a gas permeable membrane covering at least a portion of the pressure relief hole, an edge part of the gas permeable membrane being connected to the fixing member, and a portion of the edge part being embedded into the second through hole, so as to prevent the edge part from moving relative to the fixing member.

14 Claims, 7 Drawing Sheets

(56) References Cited

U.S. PATENT DOCUMENTS

2014/0120387 A1    5/2014  Kinuta et al.
2019/0334138 A1*  10/2019  Song .................. H01M 50/262
2021/0036285 A1    2/2021  Huang et al.
2021/0148478 A1    5/2021  Yue et al.

FOREIGN PATENT DOCUMENTS

| | | | |
|---|---|---|---|
| CN | 110311079 | A | 10/2019 |
| CN | 110400895 | A | 11/2019 |
| CN | 209981287 | U | 1/2020 |
| CN | 112103414 | A | 12/2020 |
| CN | 212136565 | U | 12/2020 |
| CN | 112234309 | A * | 1/2021 |
| CN | 112736363 | A | 4/2021 |
| CN | 112838301 | A | 5/2021 |
| EP | 2554882 | A1 | 2/2013 |
| EP | 3115100 | A1 | 1/2017 |
| EP | 3772120 | A1 | 2/2021 |
| JP | 2017073195 | A | 4/2017 |
| WO | 2020063584 | A1 | 4/2020 |

OTHER PUBLICATIONS

CN112234309A_Machine translation (Year: 2021).*
Office Action dated Oct. 19, 2023 received in European Patent Application No. EP 21787294.4.
International Search Report and Written Opinion dated Feb. 24, 2022 received in International Application No. PCT/CN2021/097604.
First Office Action dated Mar. 30, 2024 received in Chinese Patent Application No. CN 202180058461.2.
Extended European Search Report dated Oct. 17, 2022 received in European Patent Application No. EP 21787294.4.

* cited by examiner

END COVER ASSEMBLY, BATTERY CELL, BATTERY AND ELECTRIC DEVICE

CROSS-REFERENCE TO RELATED APPLICATIONS

This application is a continuation of International Application No. PCT/CN2021/097604, filed on Jun. 1, 2021, the disclosure of which is hereby incorporated by reference in its entirety.

TECHNICAL FIELD

The present application relates to the field of battery manufacturing, in particular to an end cover assembly, a battery cell, a battery, an electric device and a method for preparing a battery cell and an apparatus for manufacturing a battery cell.

BACKGROUND

New energy vehicles are the mainstream development trend of automobile manufacturing industry. As an important part of electric devices such as new energy vehicles, battery cells are subject to constantly improved requirements for safety performance.

With the charging and discharging of the battery cell, gas will be continuously generated in the battery cell, and excessive gas pressure may cause the battery cell to explode, which may pose certain potential safety hazards.

SUMMARY

The present application provides an end cover assembly, a battery cell, a battery, an electric device and a method for preparing a battery cell and an apparatus for manufacturing a battery cell. Gas continuously generated in the battery cell is discharged timely by using a gas permeable membrane. An edge part of the gas permeable membrane is firmly and hermetically installed on a cover plate, and it is not prone to separate from the cover plate. Thus, the battery cell has good sealing performance and safety performance.

Embodiments of a first aspect of the present application provides an end cover assembly, which includes: a cover plate provided with a pressure relief hole; a fixing member fixed on the cover plate, the fixing member having a first through hole and a second through hole, and the first through hole being opposite to the pressure relief hole; and a gas permeable membrane covering at least a portion of the pressure relief hole, an edge part of the gas permeable membrane being connected to the fixing member, and a portion of the edge part being embedded into the second through hole, so as to prevent the edge part from moving relative to the fixing member.

In the end cover assembly provided by embodiments of the present application, the gas permeable membrane has a function of slow gas permeability, and can discharge gas generated inside the battery cell timely to reduce or maintain the gas pressure inside the battery cell, so that the battery cell has good safety performance. The portion of the edge part of the gas permeable membrane is embedded into the second through hole of the fixing member; and when the gas permeable membrane is deformed under an action of gas pressure inside the battery cell, the edge part is firmly and hermetically connected to the cover plate through the fixing member and is not prone to separate from the cover plate, so that the gas permeable membrane is firmly and hermetically installed on the cover plate, and the battery cell can discharge the gas generated inside the battery cell timely and has good sealing performance.

In some embodiments of the present application, there are a plurality of the second through holes, and the plurality of the second through holes are provided at intervals around the first through hole.

The plurality of the second through holes are provided around the first through hole, the portion of the edge part is embedded into the plurality of second through holes, and the edge part of the gas permeable membrane can be firmly connected to the fixing member, so that when the gas permeable membrane is installed on the cover plate by the fixing member, the gas permeable membrane is not prone to separate from the cover plate.

In some embodiments of the present application, a penetration direction of the second through hole is not perpendicular to a thickness direction of the cover plate.

Since a hole wall forming the second through hole is not perpendicular to the thickness direction of the cover plate, the gas pressure inside the battery cell acts on the gas permeable membrane, and the hole wall can exert an acting force on the portion of the edge part of the gas permeable membrane, thus preventing the gas permeable membrane from protruding in a direction away from the cover plate or even separating from the fixing member under the push of the gas pressure. With the above-mentioned structure, the gas permeable membrane can be firmly installed on the cover plate.

In some embodiments of the present application, a gap along the thickness direction of the cover plate is formed between the fixing member and the cover plate, or the fixing member has a gap along a thickness direction of the cover plate; and the edge part includes a first portion and a second portion, the first portion extends into the gap, the second portion is connected to the first portion, and the second portion is embedded into the second through hole.

The first portion extends into the gap, and two opposite surfaces forming the gap limit the first portion from both sides of the first portion, which can prevent the edge part from moving in the thickness direction of the cover plate. With this arrangement, the gas permeable membrane can be firmly installed on the cover plate.

In some embodiments of the present application, the fixing member includes a top wall, a side wall and a bottom wall, the top wall and the bottom wall are provided in parallel with the cover plate, the side wall is configured to connect the top wall to the bottom wall, the top wall and the bottom wall respectively extend from the side wall in opposite directions, the first through hole is provided in the top wall, the bottom wall is fixed to the cover plate, and the gap is formed between the top wall and the cover plate.

When the top wall and the bottom wall of the fixing member extend in opposite directions from the side wall, a gap is formed between the top wall and the cover plate, the first portion of the edge part extends between the top wall and the cover plate, and the top wall and the cover plate limit the first portion from both sides of the first portion to prevent the edge part from moving in the thickness direction of the cover plate.

In some embodiments of the present application, the fixing member includes a top wall, a side wall and a bottom wall, the top wall and the bottom wall are provided in parallel with the cover plate, the side wall is configured to connect the top wall to the bottom wall, and the top wall and the bottom wall respectively extend from the side wall in a same direction; and the first through hole penetrates through the top wall and the bottom wall, and the gap is formed between the top wall and the bottom wall.

When the top wall and the bottom wall extend in the same direction from the side wall, a gap is formed between the top wall and the bottom wall of the fixing member, the first portion of the edge part extends between the top wall and the bottom wall, and the top wall and the bottom wall limit the first portion from both sides of the first portion to prevent the edge part from moving in the thickness direction of the cover plate.

In some embodiments of the present application, the second through hole is provided in any one of the top wall, the side wall and the bottom wall.

When the top wall and the bottom wall of the fixing member extend in opposite directions from the side wall, the second through hole may be provided in the top wall or the side wall; and when the top wall and the bottom wall extend in the same direction from the side wall, the second through hole may be provided in any one of the top wall, the side wall and the bottom wall. According to the specific structure of the fixing member, the position of the second through hole can be flexibly and reasonably provided.

In some embodiments of the present application, the gas permeable membrane further includes a main body, and the edge part is formed at a periphery of the main body; and the edge part further includes a third portion, the third portion covers one side of the top wall away from the gap, and the second portion connects the first portion to the third portion.

The third portion and the first portion are respectively connected to the top wall on both sides of the top wall in the thickness direction of the cover plate, so that the top wall can be tensioned to the center of the gas permeable membrane by using the tensioning force of the gas permeable membrane, so as to prevent the top wall from being tilted due to the elastic restoring force of the sealing member deviating from the cover plate.

In some embodiments of the present application, the first portion and the third portion are both connected to the main body.

In this form, the first portion, the second portion and the third portion form a closed structure, and the closed structure passes through the second through hole, thus increasing the firmness of connection between the edge part and the fixing member.

In some embodiments of the present application, the third portion is provided with a third through hole, and the third through hole is staggered from the second through hole.

In the process of welding the fixing member to the cover plate, welding stress will be formed in the gas permeable membrane. The third through hole is provided and staggered from the second through hole, which can release the welding stress by weakening the structural rigidity of the gas permeable membrane close to the welding position and alleviate the stress concentration in the gas permeable membrane, so that the gas permeable membrane has a higher fatigue life.

In some embodiments of the present application, the gas permeable membrane is made of a polymer material, and the fixing member is made of a metal material.

In this form, the fixing member has good strength and is not prone to deform and age after long-term use; and the gas permeable membrane has gas permeability and can allow the gas inside the battery cell to be discharged outwards under the pressure difference between inside and outside, which reduces or maintains the gas pressure inside the battery cell to ensure the safety performance of the battery cell.

In some embodiments of the present application, the gas permeable membrane is molded on the fixing member by injection molding.

The gas permeable membrane is molded on the fixing member by injection molding, which is simple in processing and high in molding efficiency.

In some embodiments of the present application, the end cover assembly further includes a sealing member provided between the gas permeable membrane and the cover plate to seal a slit between the gas permeable membrane and the cover plate, or provided between the gas permeable membrane and the fixing member to seal a slit between the gas permeable membrane and the fixing member.

By arranging the sealing member, the slit between the gas permeable membrane and the cover plate or the slit between the gas permeable membrane and the fixing member can be sealed circumferentially, so as to prevent the electrolyte from seeping out from the slit between the gas permeable membrane and the cover plate or the slit between the gas permeable membrane and the fixing member.

In some embodiments of the present application, the gas permeable membrane is configured to be actuated when an internal pressure or a temperature of the battery cell reaches a threshold value, so as to release the internal pressure of the battery cell.

By using the gas permeable membrane instead of the protective sheet of the traditional pressure relief part, the gas permeable membrane can not only discharge the gas generated inside the battery cell timely, but also release the gas pressure through rupture when the gas pressure inside the battery cell rises rapidly. The pressure relief part integrates the function of slow gas permeability on the basis of the original rupture actuation, thus simplifying the structure of the battery cell.

Embodiments of a second aspect of the present application provides a battery cell, which includes a housing, an electrode assembly and the end cover assembly described in any one of the above. The housing has an opening, the electrode assembly is located within the housing, and the end cover assembly encapsulates the opening.

Embodiments of a third aspect embodiment of the present application provides a battery, which includes the above-mentioned battery cell.

Embodiments of a fourth aspect of the present application provides an electric device, which includes the above-mentioned battery.

Embodiments of a fifth aspect of the present application provides a method for preparing a battery cell, the method includes:

providing a housing, the housing having an opening;
providing an electrode assembly;
providing an end cover assembly, the end cover assembly including:
a cover plate provided with a pressure relief hole;
a fixing member fixed on the cover plate, the fixing member having a first through hole and a second through hole, and the first through hole being opposite to the pressure relief hole; and
a gas permeable membrane covering at least a portion of the pressure relief hole, an edge part of the gas permeable membrane being connected to the fixing member, and a portion of the edge part being embedded into the second through hole, so as to prevent the edge part from moving relative to the fixing member; and
placing the electrode assembly in the housing, and encapsulating the opening by using the end cover assembly.

Embodiments of a sixth aspect of the present application provides an apparatus for manufacturing a battery cell, the device includes:

a first providing device configured to provide a housing, the housing having an opening;

a second providing device configured to provide an electrode assembly;

a third providing device configured to provide an end cover assembly, the end cover assembly including: a cover plate provided with a pressure relief hole; a fixing member fixed on the cover plate, the fixing member having a first through hole and a second through hole, and the first through hole being opposite to the pressure relief hole; and a gas permeable membrane covering at least a portion of the pressure relief hole, an edge part of the gas permeable membrane being connected to the fixing member, and a portion of the edge part being embedded into the second through hole, so as to prevent the edge part from moving relative to the fixing member; and a mounting module configured to place the electrode assembly into the housing and encapsulate the opening by using the end cover assembly.

Additional aspects and advantages of the present application will be partially given in the following description, and some of the additional aspects and advantages will become obvious from the following description, or may be learned by practice of the present application.

BRIEF DESCRIPTION OF DRAWINGS

In order to explain the technical schemes of the embodiments of the present application more clearly, the drawings used in the embodiments of the present application will be briefly introduced below. Obviously, the drawings described below are only some embodiments of the present application, and for those of ordinary skill in the art, other drawings can be obtained according to the drawings without creative labor.

Figure 1:
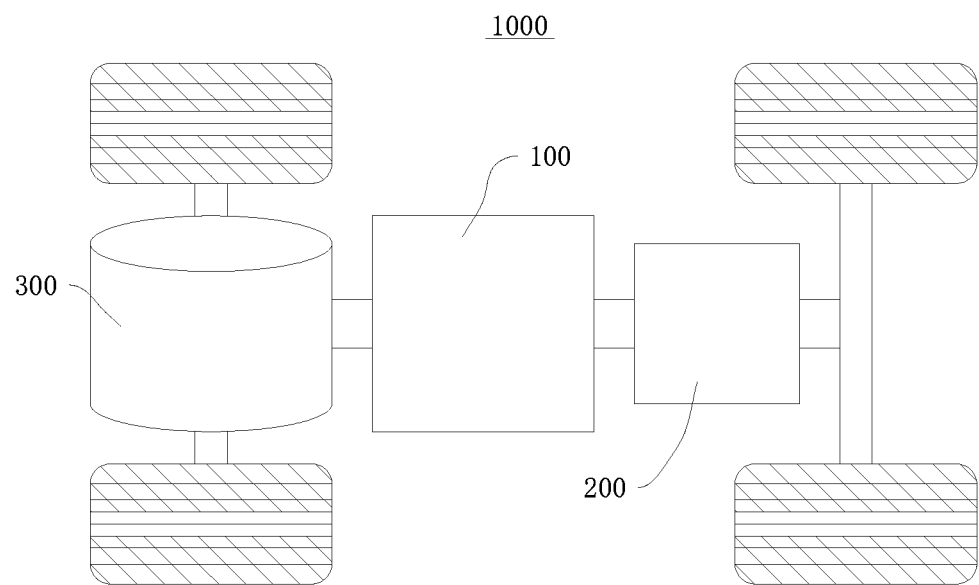
FIG. 1 is a simplified schematic diagram of a vehicle in an embodiment of the present application.

Description of reference numerals: 1000—vehicle; 100—battery; 200—controller; 300—motor; 10—battery cell; 20—box body; 21—first box body; 22—second box body; 30—housing; 40—end cover assembly; 41—cover plate; 411—pressure relief hole; 412—annular sink; 413—electrode lead-out hole; 42—fixing member; 421—first through hole; 422—second through hole; 423—top wall; 424—side wall; 425—bottom wall; 426—first side; 427—second side; 43—gas permeable membrane; 431—main body; 432—edge part; 4321—first portion; 4322—second portion; 4323—third portion; 4324—third through hole; 44—gap; 45—sealing member; 46—electrode terminal; 471—first slit; 472—second slit; 50—electrode assembly.

DESCRIPTION OF EMBODIMENTS

In order to make the objectives, technical schemes and advantages of the embodiments of the present application clearer, the technical schemes in the embodiments of the present application will be described clearly with reference to the drawings in the embodiments of the present application. Obviously, the described embodiments are only a part of embodiments of the present application, not all of them. Based on the embodiments in the present application, all other embodiments obtained by those of ordinary skill in the art without creative labor shall fall within the protection scope of the present application.

Unless otherwise defined, all technical and scientific terms used in the present application have the same meanings as those commonly understood by those skilled in the technical field of the present application. In the present application, the terms used in the description of the present application are only for the purpose of describing specific embodiments, and are not intended to limit the present application. The terms "including" and "having" and any variations thereof in the description and claims of the present application and the above-mentioned brief description of drawings are intended to cover non-exclusive inclusions. The terms "first", "second", and the like in the description and claims of the present application or the above-mentioned drawings are used to distinguish different objects, but not to describe a specific sequence or primary and secondary relationship.

Reference to an "embodiment" in the present application means that a particular feature, structure or characteristic described in conjunction with an embodiment may be included in at least one embodiment of the present application. The appearance of the phrase in various places in the description does not necessarily mean the same embodiment, nor is it an independent or alternative embodiment mutually exclusive with other embodiments. Those of ordinary skill in the art understand explicitly and implicitly that the embodiments described in the present application can be combined with other embodiments.

In the description of the present application, it should be noted that unless otherwise specified and limited, the terms "installed", "connected", and "attached" should be understood in a broad sense, for example, they can mean a fixed connection, a detachable connection or an integrated connection; they can mean a direct connection, an indirect connection through an intermediate medium, or an internal communication between two elements. For those of ordinary skill in the art, the specific meanings of the above terms in the present application can be understood according to specific conditions.

In the present application, "plurality of" means two or more (including two).

In the present application, a battery cell may be a lithium ion secondary battery, a lithium ion primary battery, a lithium sulfur battery, a sodium lithium ion battery, a sodium ion battery, or a magnesium ion battery, and the like, which is not limited in the embodiment of the present application. The battery cell may be cylindrical, flat, cuboid or in other shapes, which is not limited by the embodiments of the present application. Generally, battery cells can be divided into three types according to encapsulating methods: cylindrical battery cells, square battery cells and soft package battery cells.

The battery mentioned in the embodiments of the present application refers to a single physical module including one or more battery cells to provide higher voltage and capacity. For example, the battery mentioned in the present application may include a battery module or a battery pack, and the like. Generally, a battery includes a box body for encapsulating one or more battery cells. The box body can prevent liquid or other foreign matter from affecting the charging or discharging of the battery cell.

The battery cell includes an electrode assembly and electrolyte. The electrode assembly consists of a positive electrode plate, a negative electrode plate and a separator. The battery cell mainly relies on the movement of metal ions between the positive electrode plate and the negative electrode plate to work. The positive electrode plate includes a positive current collector and a positive active material layer. The positive active material layer is coated on the surface of the positive current collector. The positive current collector not coated with the positive active material layer protrudes from the positive current collector coated with the positive active material layer, and serves as a positive tab. Taking a lithium ion battery as an example, the material of the positive current collector may be aluminum, and the positive active material may be lithium cobaltate, lithium iron phosphate, ternary lithium, lithium manganate, or the like. The negative electrode plate includes a negative current collector and a negative active material layer. The negative active material layer is coated on the surface of the negative current collector. The positive current collector not coated with the negative active material layer protrudes from the positive current collector coated with the negative active material layer, and serves as a negative tab. The material of the negative current collector may be copper, and the negative active material may be carbon or silicon. In order to ensure that a large current is passed without fusing, the number of positive tabs is more than one and the positive tabs are stacked together, and the number of negative electrode tabs is more than one and the negative tabs are stacked together. The material of the separator may be PP (polypropylene) or PE (polyethylene), and the like. In addition, the electrode assembly may have a winding structure or a laminated structure, and the embodiments of the present application are not limited thereto.

The battery cell further includes a pressure relief part which is actuated when the internal pressure of the battery cell reaches a threshold value. The threshold design varies according to different design requirements. The threshold value may depend on one or more materials of the positive electrode plate, negative electrode plate, electrolyte and separator of the battery cell. The pressure relief part may take the form of an explosion-proof valve, a gas valve, a pressure relief valve or a safety valve, and the like, and may specifically adopt a pressure-sensitive or temperature-sensitive element or structure, that is, when the internal pressure or temperature of the battery cell reaches a threshold value, the pressure relief part performs actions or the weak structure provided in the pressure relief part is destroyed, thereby forming an opening or channel for releasing the internal pressure or temperature.

As mentioned in the present application, "actuated" means that the pressure relief part acts or is activated to a certain form, so that the internal pressure and temperature of the battery cell may be released. The action generated by the pressure relief part may include, but is not limited to that at least a portion of the pressure relief part is ruptured, broken, torn, or opened, and the like. When the pressure relief part is actuated, the high-temperature and high-pressure substances in the battery cell will be discharged from the opened portion as emissions. In this way, under the condition of controllable pressure or temperature, the pressure and the temperature of the battery cell can be released, so as to prevent potential more serious accidents.

In the related technology, the battery cell will generate gas after undergoing multiple charge and discharge cycles. Although the pressure generated by the gas will not cause the pressure relief part to actuate, it can cause the internal pressure of the battery cell to rise slowly.

The inventor found that in order to discharge the gas accumulated slowly inside the battery cell timely, a pressure relief hole communicated with the inside of the battery cell may be provided in the cover plate of the battery cell, and the pressure relief hole may be covered with a gas permeable membrane, and the gas accumulated slowly inside the battery cell can be discharged timely through the gas permeable membrane to improve the safety performance of the battery cell. However, when the gas pressure inside the battery cell acts on the gas permeable membrane, it will drive the gas permeable membrane to protrude to the outside of the battery cell, so that the edge part of the gas permeable membrane moves relative to the cover plate. If the edge part of the gas permeable membrane is not firmly connected to the cover plate, it is prone to move relative to the cover plate under the action of gas pressure inside the battery cell, resulting in separation of the edge part from the cover plate, and resulting in leakage at the joint between the edge part of the gas permeable membrane and the cover plate, thus reducing the sealing performance of the battery cell.

Based on the above ideas, the inventor of the present application proposed a technical scheme, which further firmly and hermetically installed the gas permeable membrane on the cover plate on the basis of timely discharging the gas generated inside the battery cell to reduce or maintain the gas pressure inside the battery cell, so that the gas permeable membrane is not prone to separate from the cover plate, thus improving the sealing performance of the battery cell on the basis of ensuring the safety performance of the battery cell.

It can be understood that the battery cells described in the embodiments of the present application may directly supply power to electric devices, or they may form batteries in parallel or in series, and supply power to various electric devices in the form of batteries.

It can be understood that the electric devices described in the embodiments of the present application using the battery cell or to which the battery is applicable may be in various forms, such as mobile phones, portable devices, notebook computers, battery cars, electric vehicles, ships, spacecrafts, electric toys and electric tools, and the like. For example, spacecrafts include airplanes, rockets, space shuttles and spaceships, and electric toys include fixed or mobile electric toys, such as game machines, electric vehicle toys, electric ship toys and electric aircraft toys, and the like. The electric tools include metal cutting electric tools, grinding electric tools, assembling electric tools and railway electric tools, such as electric drills, electric grinders, electric wrenches, electric screwdrivers, electric hammers, impact electric drills, concrete vibrators and electric planers.

The battery cells and batteries described in the embodiments of the present application are not only applicable to the above-mentioned electric devices, but also applicable to all electric devices using battery cells and batteries. However, for the sake of brevity, electric vehicles will be taken as an example in the following embodiments.

Figure 2:
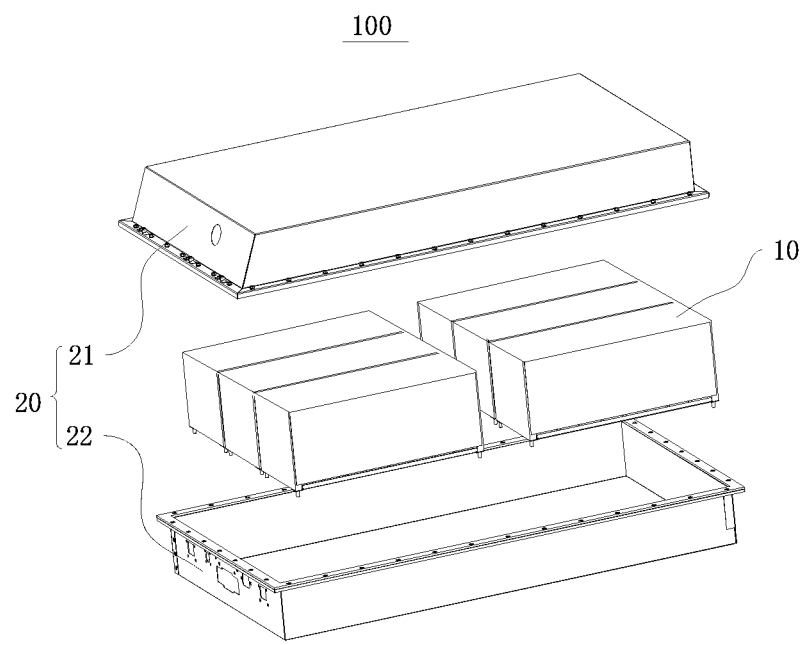
FIG. 2 is a schematic structural diagram of a battery of the vehicle in FIG. 1.
Figure 3:
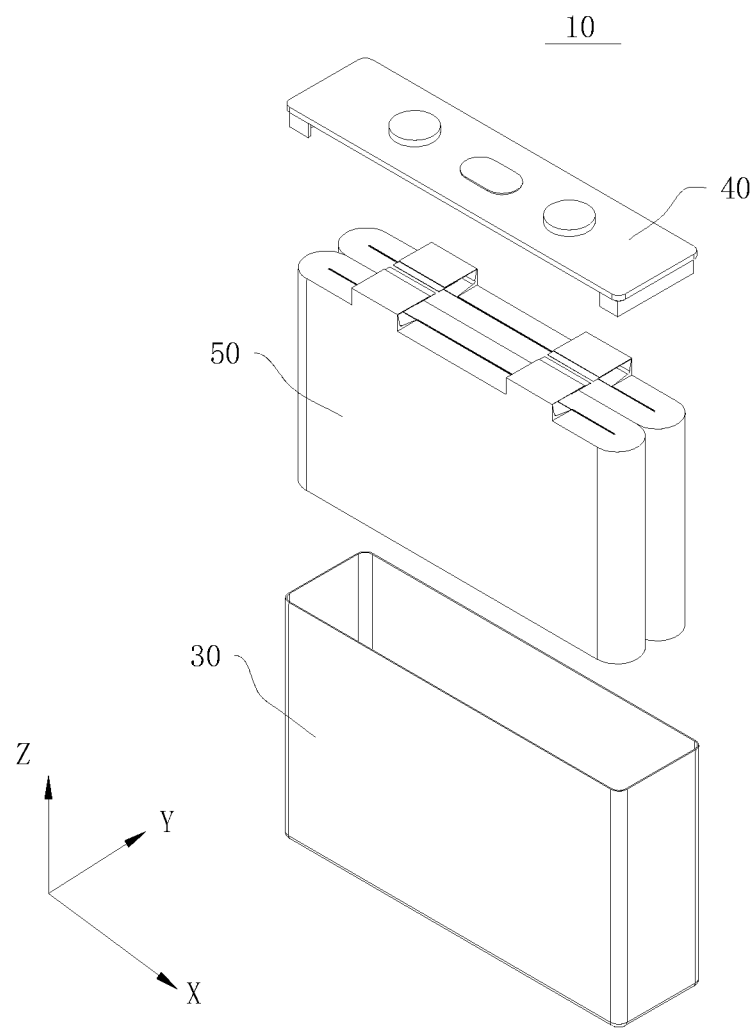
FIG. 3 is a schematic structural diagram of a battery cell of the battery in FIG. 2.

FIG. 1 is a simplified schematic diagram of a vehicle in an embodiment of the present application; FIG. 2 is a schematic structural diagram of a battery of the vehicle in FIG. 1; and FIG. 3 is a schematic structural diagram of a battery cell of the battery in FIG. 2.

As shown in FIG. 1, a battery 100, a controller 200 and a motor 300 are provided inside a vehicle 1000. For example, the battery 100 may be provided at a bottom of the vehicle 1000 or at a front or a rear of the vehicle 1000. The vehicle 1000 may be a fuel vehicle, a gas vehicle or a new energy vehicle, and the new energy vehicle may be a pure electric vehicle, a hybrid vehicle or an extended-range electric vehicle.

In some embodiments of the present application, the battery 100 may be used for power supply of the vehicle 1000, for example, the battery 100 may be used as an operating power source of the vehicle 1000. The controller 200 is configured to control the battery 100 to supply power to the motor 300, for example, for power requirements of starting, navigating, and working of the vehicle 1000 during driving.

In other embodiments, the battery 100 may be used not only as an operating power source for the vehicle 1000, but also as a driving power source for the vehicle 1000, replacing or partially replacing fuel or natural gas to provide driving power for the vehicle 1000.

The battery 100 mentioned in the embodiments of the present application refers to a single physical module including one or more battery cells to provide higher voltage and capacity. For example, the battery 100 is formed by connecting a plurality of battery cells 10 in series or in parallel.

As shown in FIG. 2, the battery 100 includes a plurality of battery cells 10 and a box body 20, and the plurality of battery cells 10 are placed in the box body 20. The box body 20 includes a first box body 21 and a second box body 22. The first box body 21 and the second box body 22 engage with each other to form a battery chamber, and a plurality of battery cells 10 are placed in the battery chamber. The shapes of the first box body 21 and the second box body 22 may be determined according to the combined shape of the plurality of battery cells 10, and each of the first box body 21 and the second box body 22 may have an opening. For example, both the first box body 21 and the second box body 22 may be hollow cuboids with only one surface being an open surface, and the openings of the first box body 21 and the second box body 22 are provided oppositely, and the first box body 21 and the second box body 22 are locked with each other to form the box body 20 with an encapsulated chamber. After being combined in parallel or in series or in series-parallel, the plurality of battery cells 10 are arranged in the box body 20 formed by locking the first box body 21 and the second box body 22.

As shown in FIG. 3, the battery cell 10 includes a housing 30, an end cover assembly 40 and an electrode assembly 50.

The housing 30 may be hexahedral or in other shapes, and an accommodating chamber is formed inside the housing 30 and used for accommodating the electrode assembly 50 and the electrolyte. One end of the housing 30 has an opening, so that the electrode assembly 50 may be placed in the accommodating chamber of the housing 30 through the opening, and a plurality of electrode assemblies 50 may be provided in the accommodating chamber, and the plurality of electrode assemblies 50 are stacked on each other. The housing 30 may be made of a metal material, such as aluminum, aluminum alloy, or nickel-plated steel. The end cover assembly 40 can encapsulate the opening of the housing 30 to encapsulate the electrode assembly 50 in the accommodating chamber. The electrode assembly 50 includes a positive electrode plate, a negative electrode plate and a separator. The separator is located between the positive electrode plate and the negative electrode plate and is configured to separate the positive electrode plate from the negative electrode plate to prevent the positive electrode and negative electrode of the electrode unit from being short-circuited.

Figure 4:
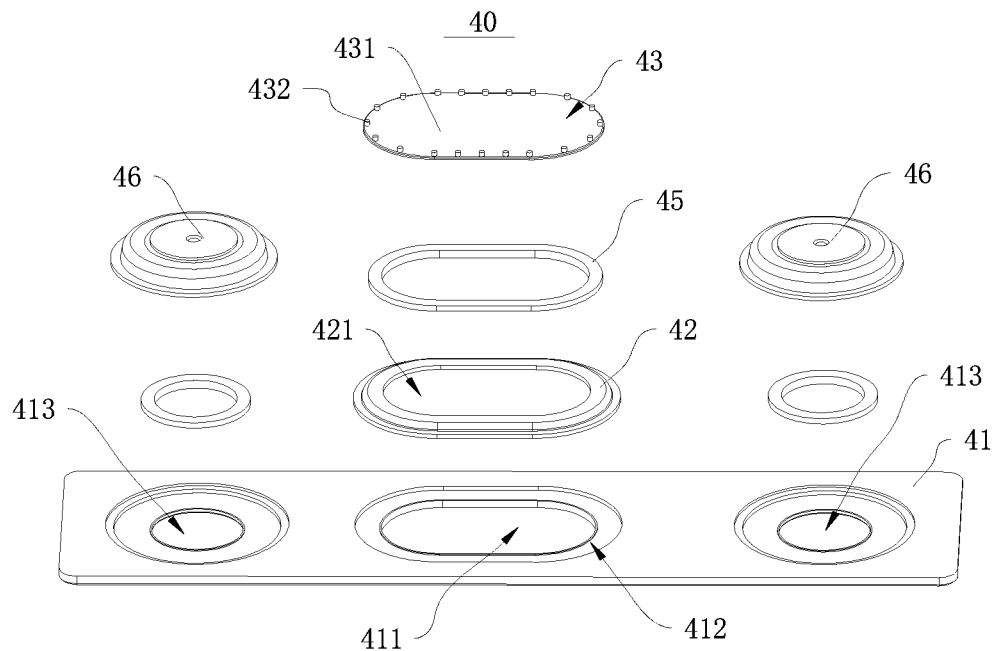
FIG. 4 is a schematic structural diagram of an end cover assembly provided in an embodiment of the present application, which shows that a top wall and a bottom wall are located on opposite sides of a side wall respectively, and a gas permeable membrane entirely covers a pressure relief hole.
Figure 5:
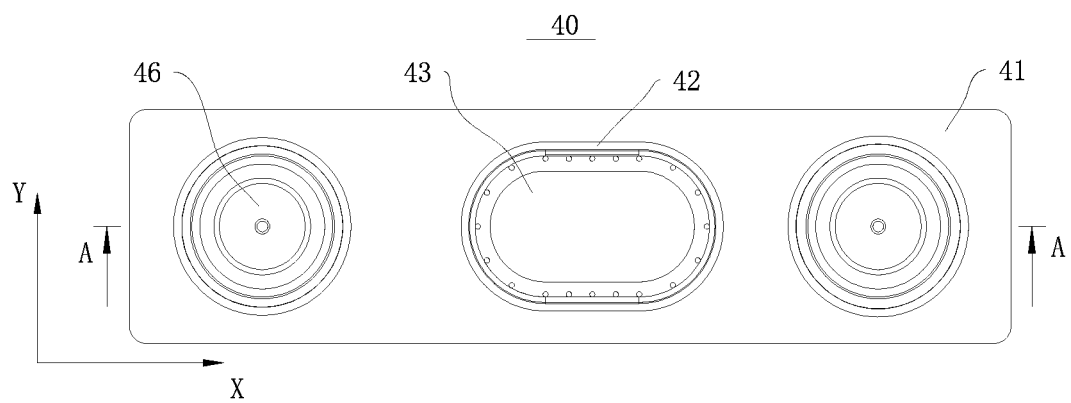
FIG. 5 is a schematic structural diagram of the end cover assembly shown in FIG. 4 from a top view.
Figure 6:
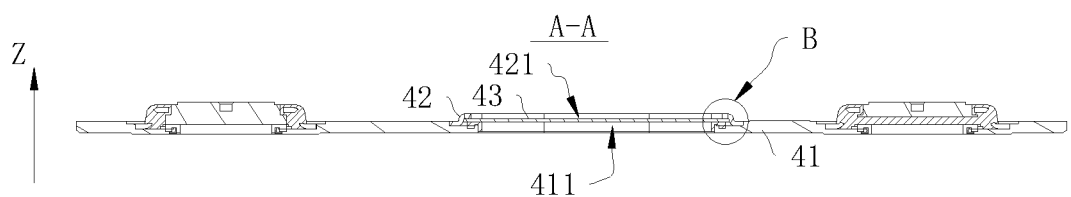
FIG. 6 is a cross-sectional view taken along A-A in FIG. 5.
Figure 7:
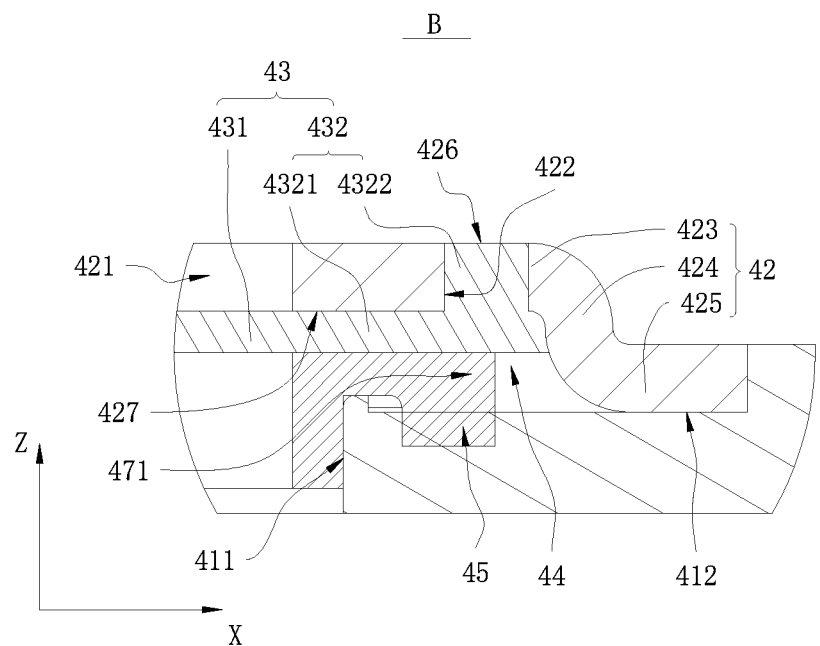
FIG. 7 is a partial enlarged view of portion B in FIG. 6.

FIG. 4 is a schematic structural diagram of the end cover assembly 40 provided in some embodiments of the present application; FIG. 5 is a schematic structural diagram of the end cover assembly 40 shown in FIG. 4 from a top view; FIG. 6 is a cross-sectional view taken along A-A in FIG. 5; and FIG. 7 is a partial enlarged view of portion B in FIG. 6.

As shown in FIG. 4, the end cover assembly 40 includes a cover plate 41, a fixing member 42 and a gas permeable membrane 43. The cover plate 41 is provided with a pressure relief hole 411, the fixing member 42 is fixed on the cover plate 41, a first through hole 421 is provided opposite to the pressure relief hole 411, and the gas permeable membrane 43 is connected to the cover plate 41 through the fixing member 42 and gas-permeably encapsulates the pressure relief hole 411.

The gas permeable membrane 43 includes a main body 431 and an edge part 432 formed at a periphery of the main body 431. The main body 431 is configured to discharge the gas generated inside the battery cell 10 timely to reduce or maintain the gas pressure inside the battery cell 10, and the edge part 432 is configured to connect to the fixing member 42. The first through hole 421 of the fixing member 42 is configured to expose the main body 431 of the gas permeable membrane 43. When the fixing member 42 is installed on the cover plate 41, the first through hole 421 aligns the pressure relief hole 411, and a portion of the gas permeable membrane 43 exposed by the first through hole 421 is the main body 431 of the gas permeable membrane 43.

As shown in FIG. 4, the end cover assembly 40 further includes two electrode terminals 46. The cover plate 41 is flat. The size and shape of the cover 41 are matched with the opening of the housing 30, and the cover plate 41 is fixed to the opening of the housing 30, thereby encapsulating the electrode assembly 50 and electrolyte in the accommodating chamber of the housing 30. The cover plate 41 is made of metal materials, such as aluminum and steel. The cover plate 41 is provided with two electrode lead-out holes 413, and the electrode terminals 46 are provided in the electrode lead-out holes 413 of the cover plate 41. One of the two electrode terminals 46 is a positive electrode terminal and the other is a negative electrode terminal. The positive electrode terminal is electrically connected to a positive tab of the electrode assembly 50 through one adapting sheet, while the negative electrode terminal is electrically connected to a negative tab of the electrode assembly 50 through another adapting sheet.

As shown in FIGS. 5 and 6, in some embodiments of the present application, the cover plate 41 has a square flat plate structure. A length direction of the cover plate 41 extends along the X direction, a width direction extends along the Y direction, and a thickness direction extends along the Z direction. The pressure relief hole 411 is centrally provided in the cover plate 41 and penetrates the cover plate 41 along the Z direction, and the two electrode lead-out holes are respectively located on both sides of the pressure relief hole 411 along the X direction.

In other embodiments, depending on the shape of the battery cell 10, the cover plate 41 may be in other shapes, such as round or oval. The pressure relief hole 411 may also be arranged at other positions of the cover plate 41 according to specific design requirements.

As shown in FIG. 7, the fixing member 42 further has a second through hole 422, and the gas permeable membrane 43 covers at least a portion of the pressure relief hole 411. The edge part 432 of the gas permeable membrane 43 is connected to the fixing member 42, and a portion of the edge part 432 is embedded into the second through hole 422 to prevent the edge part 432 from moving relative to the fixing member 42.

In the end cover assembly 40 of the embodiment, the gas permeable membrane 43 has the function of slow gas permeability, and can discharge the gas generated inside the battery cell 10 timely to reduce or maintain the gas pressure inside the battery cell 10, so as to have good safety performance; and the portion of the edge part 432 of the gas permeable membrane 43 is embedded into the second through hole 422 of the fixing member 42. When the gas permeable membrane 43 is deformed under the internal gas pressure of the battery cell 10, the edge part 432 is firmly and hermetically connected to the cover plate 41 through the fixing member 42, and is not prone to separate from the cover plate 41 under the working conditions of high temperature, high pressure and impact, so that the gas permeable membrane 43 is firmly and hermetically installed on the cover plate 41, and the battery cell 10 can discharge the gas generated in the battery cell 10 timely and has better sealing performance.

Further, the gas accumulated in the battery cell 10 can be discharged timely by using the gas permeable membrane 43, so that the gas pressure in the battery cell 10 can be reduced or maintained, thereby reducing the pressure resistance requirement of the housing 30 and allowing the thickness of the housing 30 to be reduced to improve the energy density of the battery cell 10.

The pressure relief hole 411 is provided in the cover plate 41. The pressure relief hole 411 may be provided independently of the pressure relief part, and may also be integrated with the pressure relief part.

In some embodiments of the present application, the gas permeable membrane 43 is configured to actuate when the internal pressure or temperature of the battery cell 10 reaches a threshold value, so as to release the internal pressure of the battery cell 10. That is, the pressure relief hole 411 is the pressure relief hole of the pressure relief part. Instead of the traditional protective sheet, the gas permeable membrane 43 can not only discharge the gas generated inside the battery cell 10 timely, but also release the gas pressure by rupture when the gas pressure inside the battery cell 10 rises rapidly. The pressure relief part integrates the function of slow gas permeability based on the original rupture actuation, thus simplifying the structure of the battery cell 10. The arrangement of the gas permeable membrane 43 does not occupy the arrangement space of the cover plate 41, so that the structure of the battery cell 10 is compact.

In other embodiments, the pressure relief hole 411 may also be provided independently of the pressure relief part, and may be provided in the cover plate 41 or the housing 30. The gas permeable membrane 43 may discharge the gas generated inside the battery cell 10 timely by the function of slow gas permeability, so as to maintain or reduce the gas pressure inside the battery cell 10. There may be one pressure relief hole 411, and at least a portion of the pressure relief hole 411 is covered with a gas permeable membrane 43; and there may also be a plurality of pressure relief holes 411, and each of the plurality of pressure relief holes 411 is provided with a gas permeable membrane 43, so as to uniformly and timely discharge the gas inside the battery cell 10.

In some embodiments of the present application, the gas permeable membrane 43 is made of a polymer material. The gas permeable membrane 43 is gas-permeable, and the gas permeable membrane 43 can discharge the gas inside the battery cell 10 outward under the pressure difference between inside and outside, thereby reducing or maintaining the gas pressure inside the battery cell 10 to ensure the safety performance of the battery cell 10. For example, the gas permeable membrane 43 may be made of fluorinated ethylene propylene copolymer (FEP), polychlorotrifluoroethylene (PCTFE), and the like.

In some embodiments of the present application, the fixing member 42 is made of metal. For example, the material of the fixing member 42 may be the same as that of the housing 30 and the cover plate 41, such as aluminum, steel and other materials or alloy materials. The fixing member 42 is connected to the cover plate 41 by welding.

In other embodiments, the material of the fixing member 42 may be other hard plastic materials that do not react with electrolyte, and the fixing member 42 is fixed to the cover plate 41 by bonding, hot pressing and the like.

The gas permeable membrane 43 may be connected to the fixing member 42 in various forms, so that the edge part 432 is firmly and hermetically connected to the fixing member 42, so that the gas permeable membrane 43 is uniformly stressed and is not prone to separate from the fixing member 42.

In some embodiments of the present application, the gas permeable membrane 43 is injection molded on the fixing member 42. In this way, the gas permeable membrane 43 is easy to process and high in molding efficiency, and has good circumferential sealing performance between the edge part 432 and the fixing member 42.

In other embodiments, the gas permeable membrane 43 may be molded first, and the portion of the edge part 432 may be embedded into the second through hole 422 of the fixing member 42, and the gas permeable membrane 43 and the fixing member 42 may be integrally connected by assembly, thereby reducing the manufacturing cost and facilitating the recycle of the fixing member 42.

The fixing member 42 is configured to install the gas permeable membrane 43 on the cover plate 41. The fixing member 42 not only needs to be fixedly connected to the cover plate 41, but the edge part 432 of the gas permeable membrane 43 is also partially embedded into the second through hole 422 of the fixing member 42 to fixedly connect the gas permeable membrane 43 with the fixing member 42, so that the main body 431 aligns the pressure relief hole 411. When the gas pressure inside the battery cell 10 acts on the main body 431, since the edge part 432 is firmly and hermetically connected to the cover plate 41 through the fixing member 42, it can ensure that the gas permeable membrane 43 will not separate from the cover plate 41 in the process of slow gas permeability, thus having higher safety performance and sealing performance.

The following is a further description of the specific embodiment in which the fixing member 42 is connected to the cover plate 41 and the specific embodiment in which the fixing member 42 is connected to the gas permeable membrane 43 by injection molding.

The fixing member 42 and the cover plate 41 may be fixedly connected in various forms, so as to seal and firmly install the gas permeable membrane 43 on the cover plate 41, and prevent the gas permeable membrane 43 from separating from the cover plate 41 due to the weak connection between the fixing member 42 and the cover plate 41.

In some embodiments of the present application, the first through hole 421 coincides with the axis of the pressure relief hole 411, and the thickness direction of the main body 431 of the gas permeable membrane 43 is the same as the axis direction of the pressure relief hole 411, and both extend along the Z direction. In this form, the main body 431 can be uniformly stressed, and the separation or tearing of the gas permeable membrane 43 from the fixing member 42 due to uneven stress can be prevented.

The portion of the edge part 432 of the gas permeable membrane 43 is embedded into the second through hole 422 of the fixing member 42, and the second through hole 422 is configured to connect to part of the edge part 432 of the gas permeable membrane 43, so as to firmly and hermetically install the gas permeable membrane 43 on the fixing member 42. For example, the portion of the edge part 432 includes a plurality of protruding structures, each of the plurality of protruding structures is embedded into the corresponding second through hole 422, and the cross section of the protruding structure may be round, elongated or oval.

In the above embodiments, the first through hole 421, the second through hole 422, and the pressure relief hole 411 may be round holes, oval holes, square holes, or holes with other regular shapes, which is not limited by the embodiments of the present application.

In some embodiments of the present application, there are a plurality of the second through holes 422, and the plurality of the second through holes 422 are provided at intervals around the first through hole 421. By arranging the plurality of second through holes 422 around the first through hole 421 at intervals, when the portion of the edge part 432 is embedded into the second through holes 422, the gas permeable membrane 43 may be firmly connected to the fixing member 42, and when the gas permeable membrane 43 is installed on the cover plate 41 by the fixing member 42, the gas permeable membrane 43 is not prone to separate from the cover plate 41.

In other embodiments of the present application, the plurality of second through holes 422 are circumferentially and uniformly spaced around the first through hole 421 at intervals, so that the edge part 432 of the gas permeable membrane 43 is circumferentially and uniformly connected to the fixing member 42. When the gas pressure inside the accommodating chamber of the battery cell 10 acts on the gas permeable membrane 43, the edge part 432 of the gas permeable membrane 43 is uniformly stressed in the circumferential direction, so that tearing of the main body 431 of the gas permeable membrane 43 due to uneven stress can be prevented.

In other embodiments, the plurality of second through holes 422 may be arranged on the entire peripheral side of the first through hole 421. For example, the plurality of second through holes 422 are also arranged in a rectangular array or roughly at a periphery of the first through hole 421 according to the shape of the fixing member 42 and the space that can be used for arrangement, so that the arrangement position and number of the second through holes 422 can not only fix the gas permeable membrane 43 roughly circumferentially and uniformly, but also ensure the overall strength requirements of the fixing member 42.

In other embodiments, at least one second through hole 422 may be arranged in a portion of the peripheral side of the first through hole 421. For example, the plurality of second through holes 422 are provided around the first through hole 421 at one side of the first through hole 421 in the length direction (i.e., the X direction) of the cover plate 41, and one portion of the gas permeable membrane 43 is embedded into the second through holes 422 at one side of the cover plate 41 along the X direction, and the other portion is connected to the fixing member 42 by pressing or gluing, which can also ensure that the peripheral side of the gas permeable membrane 43 is hermetically installed on the cover plate 41. For example, one of the plurality of second through holes 422 is provided at a periphery of the first through hole 421, and one portion of the gas permeable membrane 43 is embedded into the second through hole 422 at one side of the cover plate 41 along the X direction, and the other part is connected to the fixing member 42 by pressing or gluing.

As shown in FIG. 7, the edge part 432 of the gas permeable membrane 43 includes a first portion 4321 and a second portion 4322. The second portion 4322 is connected to the first portion 4321, and the second portion 4322 is embedded into the second through hole 422 to be connected to the fixing member 42.

In the above structural forms, the second through hole 422 may be completely filled by the second portion 4322, so as to increase the contact area between the second portion 4322 and the fixing member 42, so that the edge part 432 is firmly connected to the fixing member 42.

In other embodiments, the second portion 4322 may also be partially embedded into the second through hole 422, so as to save the material for injection molding melt on the basis of ensuring the connection strength between the gas permeable membrane 43 and the fixing member 42.

In some embodiments of the present application, the fixing member 42 includes a top wall 423, a side wall 424 and a bottom wall 425. The top wall 423 and the bottom wall 425 are provided in parallel with the cover plate 41, and the side wall 424 is configured to connect the top wall 423 and the bottom wall 425.

In other embodiments, the fixing member 42 is not limited to the above structure. For example, the fixing member 42 may include the top wall 423 and the side wall 424. The top wall 423 is connected to the side wall 424. The top wall 423 is configured to install the gas permeable membrane 43, and a side of the side wall 424 away from the top wall 423 is connected to the cover plate 41. For example, the fixing member 42 may include the side wall 424 and the bottom wall 425. The side wall 424 is connected to the bottom wall 425, and a side of the side wall 424 away from the bottom wall 425 is configured to install the gas permeable membrane 43, and the bottom wall 425 is configured to connect to the cover plate 41.

When the fixing member 42 is connected to the gas permeable membrane 43 and the fixing member 42 is installed on the cover plate 41, the first through hole 421 aligns the pressure relief hole 411, and the gas permeable membrane 43 may entirely or partially cover the pressure relief hole 411. As used herein, "cover" means that the projected outer contour of the gas permeable membrane 43 on the XY plane includes the contour of the pressure relief hole 411. Correspondingly, the top wall 423 and the bottom wall 425 may be located on opposite sides of the side wall 424, or may be located on a same side.

Two embodiments are exemplarily described below.

In some embodiments of the present application, the top wall 423 and the bottom wall 425 are located on opposite sides of the side wall 424, respectively, and the gas permeable membrane 43 entirely covers the pressure relief hole 411.

As shown in FIG. 7, in some embodiments of the present application, the top wall 423 and the bottom wall 425 respectively extend from the side wall 424 to opposite directions along the X direction, the first through hole 421 is provided in the top wall 423, the bottom wall 425 is fixed to the cover plate 41, and a gap 44 is formed between the top wall 423 and the cover plate 41. The gap 44 along the thickness direction of the cover plate 41 is formed between the fixing member 42 and the cover plate 41, and the gas permeable membrane 43 entirely covers the pressure relief hole 411, and the first portion 4321 of the gas permeable membrane 43 extends into the gap 44. The second through hole 422 is provided in the top wall 423, and the second portion 4322 is embedded into the second through hole 422.

When the top wall 423 and the bottom wall 425 extend from the side wall 424 in opposite directions, the fixing member 42 protrudes from the cover plate 41 in the direction away from the cover plate 41 along the Z direction, and the bottom wall 425 of the fixing member 42 can be placed on the cover plate 41 first and then welded with the cover plate 41, thus simplifying the installation process of the fixing member 42.

In other embodiments of the present application, the surface of the cover plate 41 is concavely formed with an annular sink 412. The annular sink 412 is coaxially provided at a periphery of the pressure relief hole 411. When the fixing member 42 is installed on the cover plate 41, the bottom wall 425 of the fixing member 42 abuts against the annular sink 412, and the annular sink 412 not only plays a role of pre-positioning, but also appropriately reduces the height of the top wall 423 protruding from the cover plate 41, so as to alleviate the increase of the outer dimension of the battery cell 10 along the Z direction due to the installation of the fixing member 42 and the gas permeable membrane 43.

When the top wall 423 and the bottom wall 425 extend in opposite directions from the side wall 424, the first portion 4321 extends into the gap 44, and the two opposite surfaces forming the gap 44 limit the first portion 4321 from both sides of the first portion 4321, which can prevent the edge part 432 from moving in the thickness direction of the cover plate 41.

With this arrangement, the gas permeable membrane 43 can be firmly attached to the cover plate 41. The gas permeable membrane 43 is provided on one side of the top wall 423 close to the cover plate 41, extends into the gap 44 formed between the surface of the cover plate 41 and the top wall 423 through the first portion 4321, and is embedded into the second through hole 422 of the fixing member 42 through the second portion 4322. When the gas pressure inside the accommodating chamber increases, the pressure along the thickness direction of the cover plate 41 (i.e., the Z direction) will be exerted to the gas permeable membrane 43, and the top wall 423 of the fixing member 42 can press the edge part 432 circumferentially, thus preventing the edge part 432 of the gas permeable membrane 43 from separating from the fixing member 42 and causing the gas permeable membrane 43 to fall off in advance when the rupture gas pressure is not reached.

As shown in FIG. 7, in the above embodiment, the second through hole 422 is provided in the top wall 423. In other embodiments, the second through hole 422 may also be provided in the side wall 424. According to the specific structure of the fixing member 42, the position of the second through hole 422 may be reasonably provided.

As shown in FIG. 7, in some embodiments of the present application, the end cover assembly 40 further includes a sealing member 45 provided between the gas permeable membrane 43 and the cover plate 41 for sealing a slit (that is, a first slit 471) between the gas permeable membrane 43 and the cover plate 41 along the Z direction.

By providing the sealing member 45, the first slit 471 can be sealed circumferentially to prevent the electrolyte from seeping out from the slit between the gas permeable membrane 43 and the cover plate 41, so as to prevent reducing the sealing performance of the battery cell 10.

In other embodiments of the present application, the top wall 423 and the bottom wall 425 are respectively located on both sides at a same side of the side wall 424, and the gas permeable membrane 43 partially covers the pressure relief hole 411.

Figure 8:
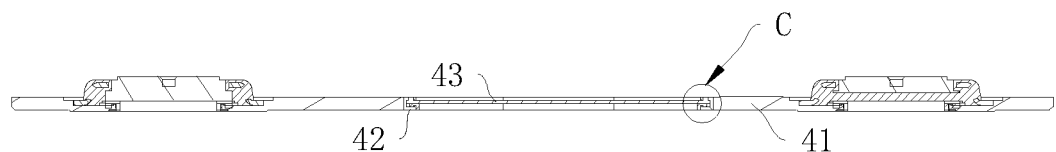
FIG. 8 is a cross-sectional view of an end cover assembly provided in an embodiment of the present application, which shows that a top wall and a bottom wall are located on a same side of a side wall respectively, and a gas permeable membrane partially covers the pressure relief hole.
Figure 9:
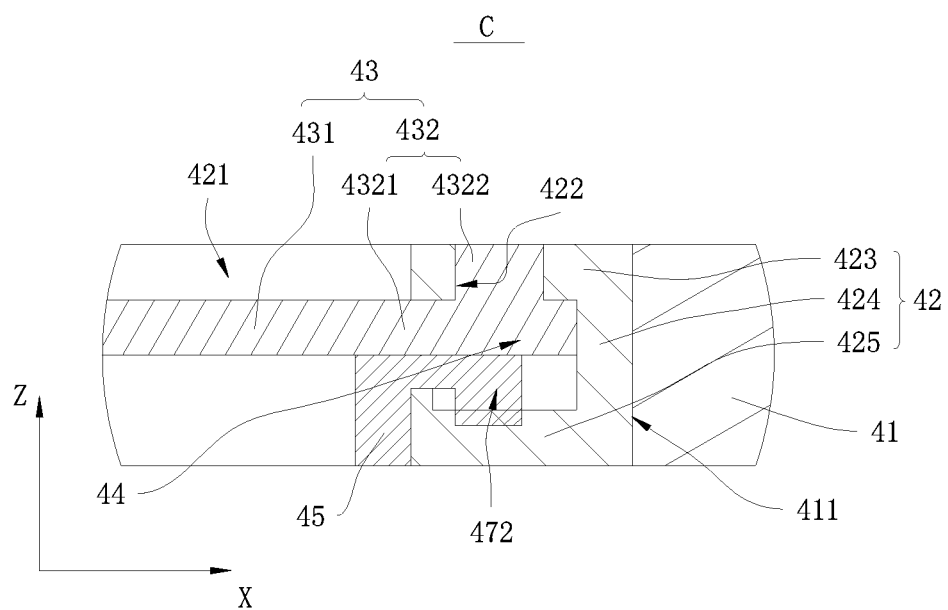
FIG. 9 is a partial enlarged view of portion C in FIG. 8.

FIG. 8 is a cross-sectional view of the end cover assembly 40 in some embodiments of the present application, which shows that the top wall 423 and the bottom wall 425 are located on a same side of the side wall 424 respectively, and the gas permeable membrane 43 partially covers the pressure relief hole 411. FIG. 9 is a partial enlarged view of portion C in FIG. 8.

As shown in FIGS. 8 and 9, in some other embodiments of the present application, the top wall 423 and the bottom wall 425 respectively extend from the side wall 424 in a same direction along the X direction, and the gap 44 along the thickness direction of the cover plate 41 is formed between the fixing member 42 and the cover plate 41. The first through hole 421 penetrates the top wall 423 and the bottom wall 425, and the gap 44 is formed between the top wall 423 and the bottom wall 425. The gas permeable membrane 43 partially covers the pressure relief hole 411, and the first portion 4321 of the gas permeable membrane 43 extends into the gap 44. The second through hole 422 is provided in the top wall 423, and the second portion 4322 is embedded into the second through hole 422.

When the top wall 423 and the bottom wall 425 extend in the same direction from the side wall 424, the first portion 4321 of the edge part 432 of the gas permeable membrane 43 is provided in the gap 44 formed between the top wall 423 and the bottom wall 425, thus it can be more firmly connected to the edge part 432 of the gas permeable membrane 43, so as to prevent the gas permeable membrane 43 from falling out under impact and high temperature environments. Based on the structure of the fixing member 42 in this form, the peripheral side of the edge part 432 of the gas permeable membrane 43 is connected to a hole wall of the first through hole 421, and neither the gas permeable membrane 43 nor the fixing member 42 protrudes from the surface of the cover plate 41, thereby reducing the volume of the battery cell 10. When the volume of the box body 20 of the battery 100 is the same, the box body 20 can accommodate more battery cells 10, so that the battery cells 10 have a higher energy density.

When the top wall 423 and the bottom wall 425 extend in a same direction from the side wall 424, the gap 44 is formed between the top wall 423 and the bottom wall 425 of the fixing member 42. The first portion 4321 of the edge part 432 is inserted between the top wall 423 and the bottom wall 425, and the top wall 423 and the bottom wall 425 limit the first portion 4321 from both sides of the first portion 4321 to prevent the edge part 432 from moving in the thickness direction of the cover plate 41.

As shown in FIG. 9, in the above embodiment, the second through hole 422 is provided in the top wall 423, and the second portion 4322 is embedded into the second through hole 422 from one side of the top wall 423 close to the gap 44. The top wall 423 can exert a force on the edge part 432 toward the cover plate 41, so as to prevent the gas permeable membrane 43 from separating from the fixing member 42 in the direction away from the cover plate 41.

In other embodiments, the second through hole 422 may also be provided at any one of the side wall 424 and the bottom wall 425. For example, when the area of the top wall 423 is not suitable for arranging the second through hole 422, the second through hole 422 may be provided at the side wall 424, the bottom wall 425 or the joint between the side wall 424 and the bottom wall 425. The top wall 423 is configured to be in contact with the first portion 4321 to exert a force on the edge part 432 toward the cover plate 41, and the second portion 4322 is embedded into the second through hole 422 to connect the edge part 432 with the fixing member 42.

In some embodiments of the present application, the end cover assembly 40 further includes the sealing member 45 provided between the gas permeable membrane 43 and the bottom wall 425 of the fixing member 42, and is used for sealing a slit (that is, a second slit 472) between the gas permeable membrane 43 and the fixing member 42 along the Z direction.

By providing the sealing member 45, the second slit 472 can be sealed circumferentially to prevent the electrolyte from seeping out from the slit between the gas permeable membrane 43 and the bottom wall 425, so as to avoid reducing the sealing performance of the battery cell.

When the gas permeable membrane 43 is installed on the cover plate 41, the main body 431 is pressed by the gas pressure inside the battery cell 10 and tends to protrude away from the cover plate 41, which may cause the edge part 432 to separate from the fixing member 42. If a force opposite to the direction of gas pressure can be exerted to the edge part 432, it can ensure that the gas permeable membrane 43 and the cover plate 41 will not be displaced along the thickness direction of the cover plate 41, and the firmness and sealing performance of the connection between the gas permeable membrane 43 and the cover plate 41 can be improved.

In some embodiments of the present application, the penetration direction of the second through hole 422 is not perpendicular to the thickness direction of the cover plate 41. Since the hole wall forming the second through hole 422 is not perpendicular to the thickness direction of the cover plate 41, when a side of the gas permeable membrane 43 close to the cover plate 41 is subjected to the gas pressure from the accommodating chamber, the hole wall can exert an acting force on the second portion 4322 of the edge part 432, preventing the gas permeable membrane 43 from protruding in the direction away from the cover plate 41 or even separating from the fixing member 42 under the pushing of the gas pressure inside the battery cell 10, so that it can be firmly installed on the cover plate 41.

Figure 10:
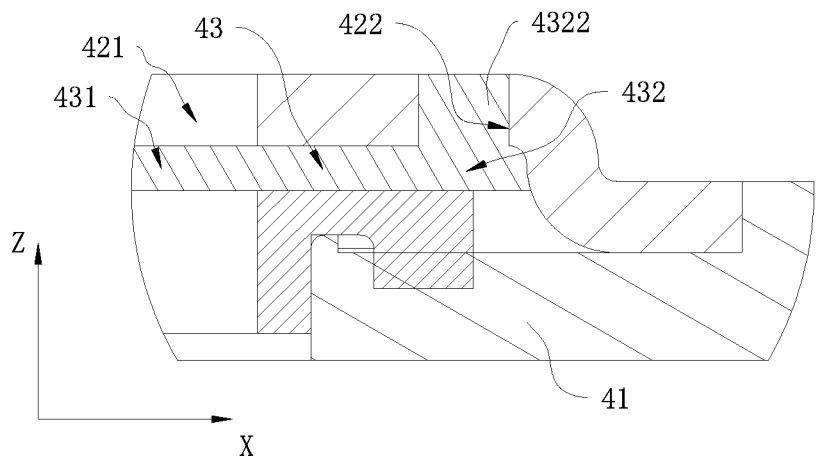
FIG. 10 is a partial structural diagram showing that a second portion of the gas permeable membrane is embedded into a second through hole, and a penetration direction of the second through hole is parallel to a thickness direction of a cover plate.
Figure 11:
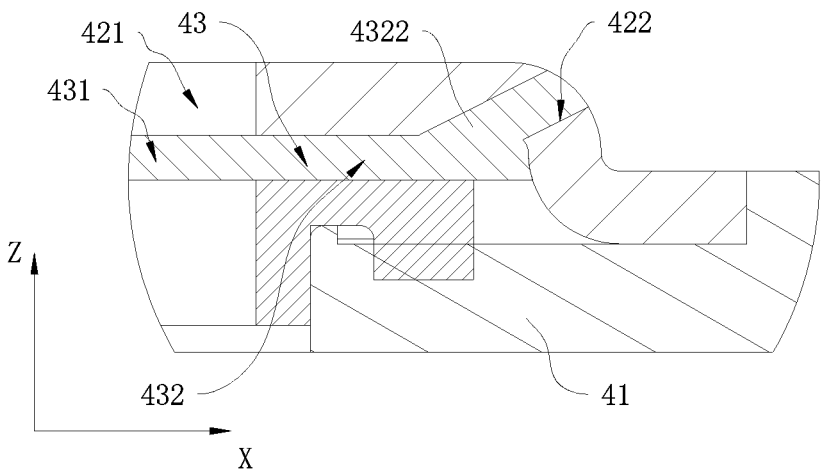
FIG. 11 is a partial structural diagram showing that the second portion of the gas permeable membrane is embedded into the second through hole, and the penetration direction of the second through hole is inclined relative to the thickness direction of the cover plate.
Figure 12:
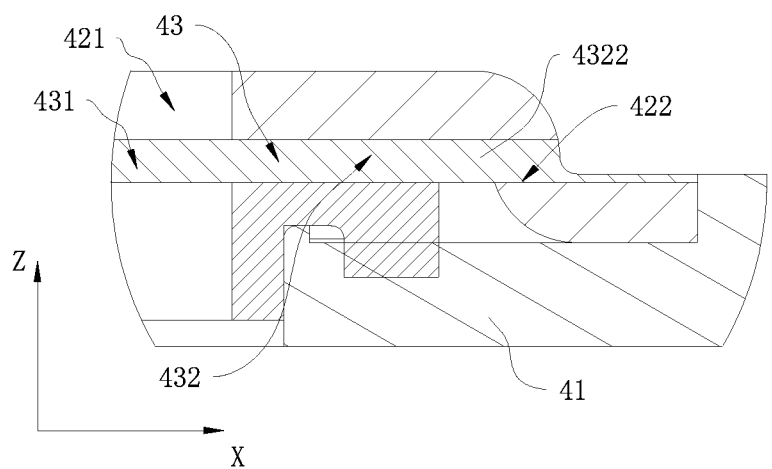
FIG. 12 is a partial structural diagram showing that the second portion of the gas permeable membrane is embedded into the second through hole, and the penetration direction of the second through hole is perpendicular to the thickness direction of the cover plate.

FIGS. 10, 11 and 12 are all partial structural diagrams showing that the second portion 4322 of the edge part 432 of the gas permeable membrane 43 is embedded into the second through hole 422. FIG. 10 is a schematic structural diagram showing that the penetration direction of the second through hole 422 is parallel to the thickness direction of the cover plate 41, FIG. 11 is a schematic structural diagram showing that the penetration direction of the second through hole 422 is inclined relative to the thickness direction of the cover plate 41, and FIG. 12 is a schematic structural diagram showing that the penetration direction of the second through hole 422 is perpendicular to the thickness direction of the cover plate 41.

As shown in FIG. 10, in some embodiments of the present application, the penetration direction of the second through hole 422 is parallel to the thickness direction of the cover plate 41, that is, both the direction of the second through hole 422 and the thickness direction of the cover plate 41 extend along the Z direction. At this time, the hole wall forming the second through hole 422 is a vertical wall. When the side of the gas permeable membrane 43 close to the cover plate 41 is acted by the gas pressure inside the battery cell 10, it tends to move away from the cover plate 41 along the Z direction. The hole wall forming the second through hole 422 acts on the second portion 4322 of the edge part 432 of the gas permeable membrane 43, and the hole wall exerts an acting force on the second portion 4322 away from the first through hole 421 along the X direction. The gas permeable membrane 43 can be flattened outward along the radial direction of the first through hole 421, so that the gas permeable membrane 43 is prevented from protruding along the Z direction away from the cover plate 41, thereby the edge part 432 is prevented from separating from the fixing member 42.

As shown in FIG. 11, in other embodiments of the present application, the penetration direction of the second through hole 422 and the thickness of the cover plate 41 are inclined relative to each other, that is, the thickness direction of the cover plate 41 extends along the Z direction, and the penetration direction of the second through hole 422 does not extend along either the Z direction or the X direction. At this time, the hole wall forming the second through hole 422 extends obliquely, and the hole wall forming the second through hole 422 can not only provide the second portion 4322 of the edge part 432 with a pressing force pointing to the cover plate 41 along the Z direction, but also provide a pulling force extending radially outward to the first through hole 421 along the X direction. Therefore, in this structural form, the fixing member 42 can not only prevent the gas permeable membrane 43 from protruding away from the cover plate 41 along the Z direction, but also press the gas permeable membrane 43 against the cover plate 41 along the Z direction. In this structural form, as the hole wall has a slope, the flow resistance of the injection molding melt can be reduced, and the injection molding melt can enter the second through hole 422 more smoothly and fill the second through hole 422, thereby improving the material filling rate of the molded gas permeable membrane 43.

As shown in FIG. 12, in other embodiments, the penetration direction of the second through hole 422 may also be perpendicular to the thickness direction of the cover plate 41, that is, the thickness direction of the cover plate 41 extends along the Z direction, and the penetration direction of the second through hole 422 extends along the X direction. At this time, the hole wall forming the second through hole 422 is a wall surface whose tangential direction extends along the X direction, and acts on the edge part 432 along the hole wall along the Z direction, so as to prevent the gas permeable membrane 43 from moving away from the cover plate 41 along the Z direction. In this structural form, the injection molding melt has a small flow resistance, and the molded gas permeable membrane 43 also has a good material filling rate.

It should be mentioned that in the process of molding the gas permeable membrane 43 on the fixing member 42 by injection molding, the position of the second through hole 422, the penetration direction of the second through hole 422 and the included angle between the side wall 424 and the bottom wall 425 can be comprehensively considered, which can not only make the molded gas permeable membrane 43 have a good material filling rate, but also facilitate the demolding process when the injection molding is completed.

Figure 13:
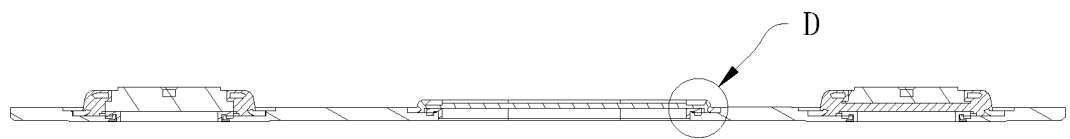
FIG. 13 is a cross-sectional view showing an end cover assembly provided in an embodiment of the present application, which shows that the second through hole is provided in the side wall, the penetration direction of the second through hole and the thickness direction of the cover plate are inclined relative to each other, and an obtuse angle is formed between the side wall and the bottom wall.
Figure 14:
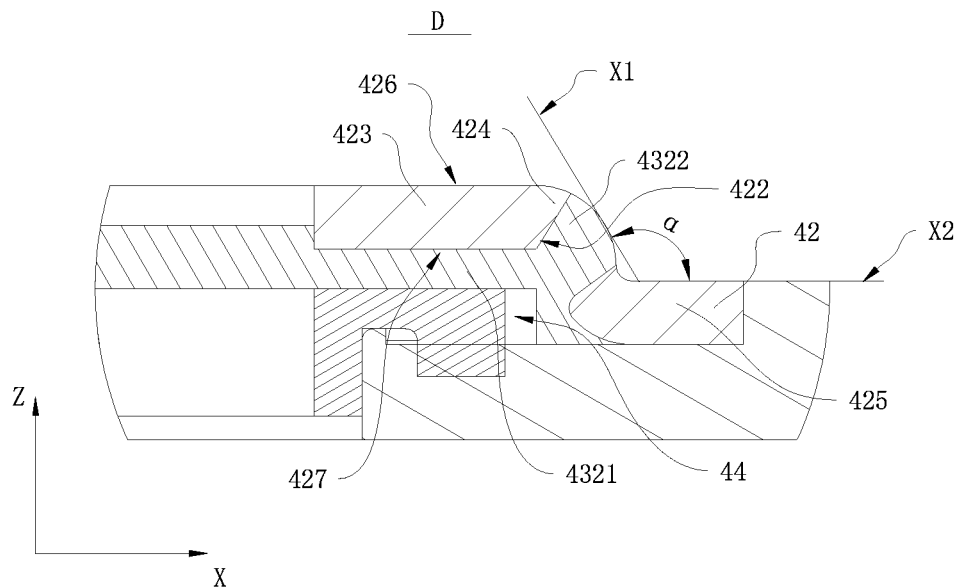
FIG. 14 is a partial enlarged view of portion D in FIG. 13.

For example, FIG. 13 schematically shows a cross-sectional view of the end cover assembly 40 in which the second through hole 422 is provided in the side wall 424, the penetration direction of the second through hole 422 and the thickness direction of the cover plate 41 are inclined relative to each other, and the side wall 424 and the bottom wall 425 are arranged at an obtuse angle. FIG. 14 schematically shows a partial enlarged view of portion D in FIG. 13.

As shown in FIG. 13 and FIG. 14, in some embodiments of the present application, the second through hole 422 is provided in the side wall 424 and circumferentially spaced at a periphery of the first through hole 421, and penetrates the side wall 424 along the thickness direction of the side wall 424. The tangential direction of the side wall 424 is X1, and the tangential direction of the bottom wall 425 is X2. The included angle between the side wall 424 and the bottom wall 425 is the included angle α between X1 and X2. α is an obtuse angle to facilitate the separation of the upper mold from the integrated fixing member 42 and the gas permeable membrane 43 when the injection molding is completed. For example, α=110°.

In this form, in the end cover assembly 40, the gas permeable membrane 43 can be firmly connected to the fixing member 42, the position of the second through hole 422 in the fixing member 42 is reasonable, the strength of the fixing member 42 is reliable, the fixing member 42 will not be deformed after long-term use, and the gas permeable membrane 43 can be easily demolded after being molded on the fixing member 42.

In the above embodiment, the side of the top wall 423 away from the gap 44 is a first side 426, and the side close to the gap 44 is a second side 427. The gas permeable membrane 43 extends into the gap 44 at the second side 427 with the first portion 4321 and is embedded into the second through hole 422 with the second portion 4322, and is fixedly installed on the fixing member 42 through the first portion 4321 and the second portion 4322.

In some embodiments of the present application, the edge part 432 of the gas permeable membrane 43 may further include a third portion 4323. The third portion 4323 is attached to the first side 426 of the top wall 423, the first portion 4321 is attached to the second side 427 of the top wall 423, and the edge part 432 is connected to the top wall 423 from the first side 426 and the second side 427 of the top wall 423. The third portion 4323 is connected to the top wall 423, which can further improve the connection strength between the edge part 432 and the fixing member 42 on the basis of the first portion 4321 and the second portion 4322.

Figure 15:
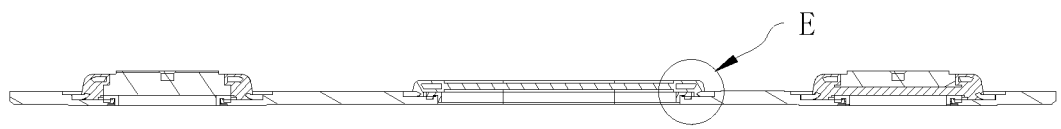
FIG. 15 is a cross-sectional view of an end cover assembly provided in an embodiment of the present application, which shows a form in which an edge part includes a third portion.
Figure 16:
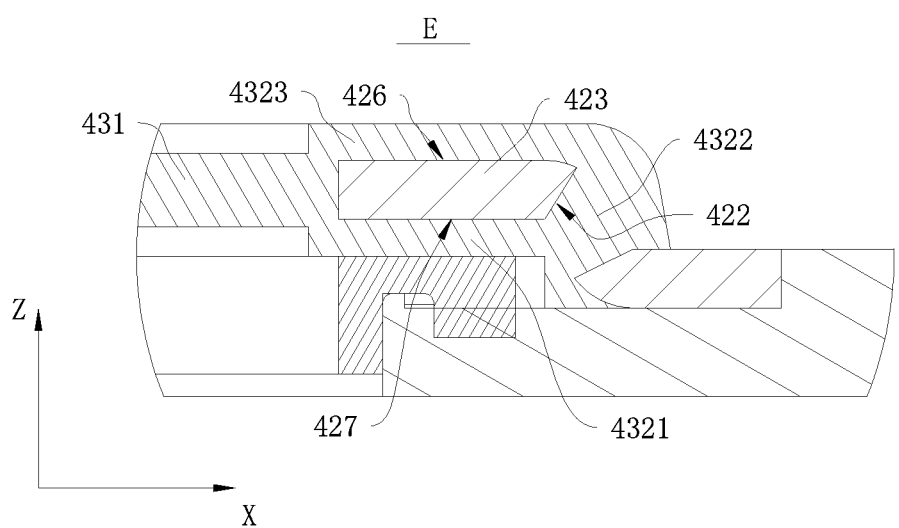
FIG. 16 is a partial enlarged view of portion E in FIG. 15.

FIG. 15 is a cross-sectional view of the end cover assembly 40 provided in an embodiment of the present application, which shows a form in which the edge part includes the third portion. FIG. 16 is a partial enlarged view of portion E in FIG. 15.

As shown in FIGS. 15 and 16, the edge part 432 of the gas permeable membrane 43 further includes the third portion 4323, which covers the first side 426 of the top wall 423, and the second portion 4322 connects the first portion 4321 and the third portion 4323.

The first portion 4321 is arranged on the second side 427 of the top wall 423, and the third portion 4323 is arranged on the first side 426 of the top wall 423, so that the top wall 423 can be tensioned towards the center of the gas permeable membrane 43 by using the tensioning force of the gas permeable membrane 43, and the top wall 423 is prevented from being tilted due to the elastic restoring force away from the cover plate 41.

As shown in FIG. 16, in some embodiments of the present application, the first portion 4321 and the third portion 4323 are both connected to the main body 431. The first portion 4321 and the third portion 4323 are respectively connected to the top wall 423 from the second side 427 and the first side 426 of the top wall 423. When the first portion 4321 and the third portion 4323 are both connected to the main body 431, the separation of either the first portion 4321 or the third portion 4323 from the top wall 423 does not affect the connection between the edge part 432 and the top wall 423, and the first portion 4321, the second portion 4322 and the third portion 4323 together form a closed annular structure, which can increase the connection firmness between the edge part 432 and the fixing member 42.

Figure 17:
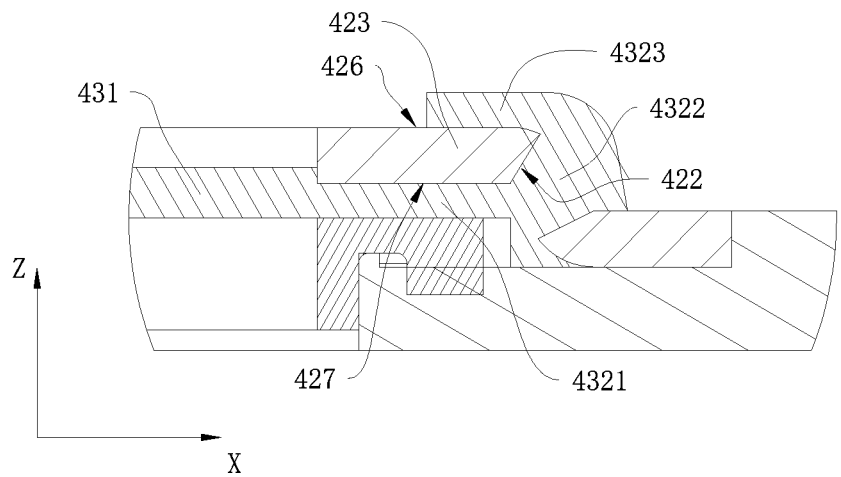
FIG. 17 is a cross-sectional view of another form of end cover assembly embodying that the edge part includes a third portion in an embodiment of the present application.

As shown in FIG. 17, in other embodiments, the first portion 4321 is connected to the main body 431, and the third portion 4323 is connected to the first portion 4321 through the second portion 4322, but not directly connected to the main body 431, that is, one end of the first portion 4321 is connected to the main body 431, and the other end is connected to the second portion 4322 and the third portion 4323 sequentially. The first portion 4321, the second portion 4322 and the third portion 4323 form a continuous hook-like structure, and the edge part 432 penetrates the side wall 424 from inside to outside and bends in the direction close to the top wall 423.

Figure 18:
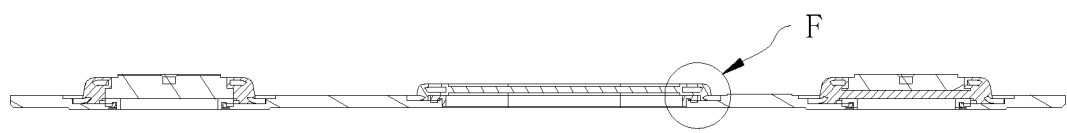
FIG. 18 is a cross-sectional view of an end cover assembly provided in an embodiment of the present application, which shows a form in which an edge part includes a third through hole.
Figure 19:
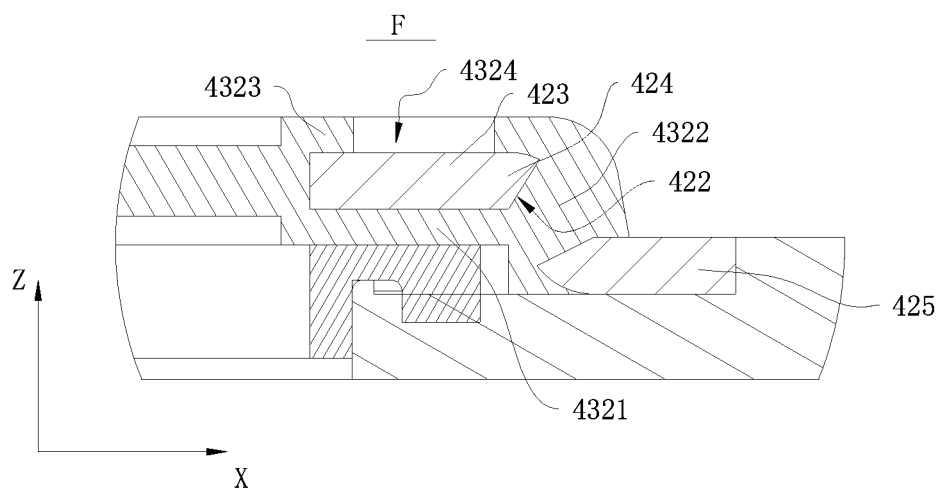
FIG. 19 is a partial enlarged view of portion F in FIG. 18. The drawings are not drawn to actual scale.

FIG. 18 is a cross-sectional view of the end cover assembly 40 provided in an embodiment of the present application, which shows a form in which the edge part 432 includes the third through hole 4324. FIG. 19 is a partial enlarged view of portion F in FIG. 18.

As shown in FIGS. 18 and 19, in some embodiments of the present application, the third portion 4323 is provided with a third through hole 4324, and the third through hole 4324 is staggered from the second through hole 422. That is, a plurality of third through holes 4324 are provided in the circumferential direction of the edge part 432, which penetrate the third portion 4323, and the second portion 4322 is embedded into the second through hole 422 of the fixing member 42 to expose the side of the fixing member 42 away from the cover plate 41.

In the process of welding the fixing member 42 to the cover plate 41, welding stress will be formed in the gas permeable membrane 43. The third through hole 4324 is provided, and the third through hole 4324 is staggered from the second through hole 422, which can relieve the welding stress by weakening the structural rigidity of the gas permeable membrane 43 close to the welding position, and alleviate the stress concentration in the gas permeable membrane 43, so that the gas permeable membrane 43 has a higher fatigue life.

As shown in FIG. 19, in some embodiments of the present application, the third through hole 4324 is provided in the third portion 4323 and close to the top wall 423, and the third through hole 4324 and the second through hole 422 are arranged at intervals on the same radial line of the first through hole 421. Providing the third through hole 4324 in a portion of the third portion 4323 close to the top wall 423 can reduce the mold cost when fixing the gas permeable membrane 43 to the fixing member 42 by injection molding.

In other embodiments, the third through hole 4324 may also be provided in the part of the third portion 4323 close to the side wall 424, and the third through hole 4324 and the second through hole 422 are arranged at intervals along the circumferential direction of the first through hole 421. Providing the third through hole 4324 in a portion of the third portion 4323 close to the side wall 424 can make the third through hole 4324 be provided close to the bottom wall 425 and closer to the welding position between the fixing member 42 and the cover plate 41, which can better relieve the welding stress.

The assembly process of the end cover assembly 40 provided in the embodiment of the present application will be described below.

The gas permeable membrane 43 is molded on the fixing member 42 by injection molding to form a membrane assembly.

The fixing member 42 of the membrane assembly is welded to the cover plate 41 so that the main body 431 aligns the pressure relief hole 411.

In the above-mentioned end cover assembly 40, the gas permeable membrane 43 has the function of slow gas permeability, and can discharge the gas generated inside the battery cell 10 timely to reduce or maintain the gas pressure inside the battery cell 10, so as to have good safety performance. The portion of the edge part 432 of the gas permeable membrane 43 is embedded into the second through hole 422 of the fixing member 42. When the gas permeable membrane 43 is deformed under the internal gas pressure of the battery cell 10, the edge part 432 is firmly and hermetically connected to the cover plate 41 through the fixing member 42, and is difficult to separate from the cover plate 41 under the working conditions of high temperature, high pressure and impact, so that the gas permeable membrane 43 is firmly and hermetically installed on the cover plate 41. Therefore, the battery cell 10 can discharge the gas generated in the battery cell 10 timely and has good sealing performance. The gas pressure inside the battery cell 10 can be reduced or maintained by using the gas permeable membrane 43 to discharge the gas accumulated inside the battery cell 10 timely, thereby reducing the pressure resistance requirement of the housing 30 and allowing the thickness of the housing 30 to be reduced to improve the energy density of the battery cell 10.

Based on the characteristics of the end cover assembly 40, the battery cell 10, battery 100 and vehicle 1000 using the end cover assembly 40 also have good safety performance, sealing performance and energy density.

An embodiment of the present application further provides a method for preparing the battery cell 10. The method includes:

providing a housing 30 having an opening;

providing an electrode assembly;

providing an end cover assembly 40, the end cover assembly 40 including: a cover plate 41 provided with a pressure relief hole 411; a fixing member 42 fixed on the cover plate 41, the fixing member 42 having a first through hole 421 and a second through hole 422, and the first through hole 421 being opposite to the pressure relief hole 411; and a gas permeable membrane 43 covering at least a portion of the pressure relief hole 411, an edge part 432 of the gas permeable membrane 43 being connected to the fixing member 42, and a portion of the edge part 432 being embedded into the second through hole 422, so as to prevent the edge part 432 from moving relative to the fixing member 42; and placing the electrode assembly in the housing 30, and encapsulating the opening by using the end cover assembly 40.

An embodiment of the present application further provides an apparatus for manufacturing a battery cell 10, which includes:

a first providing device configured to provide a housing 30, the housing 30 having an opening;

a second providing device configured to provide an electrode assembly;

a third providing device configured to provide an end cover assembly 40, the end cover assembly including: a cover plate 41 provided with a pressure relief hole 411; a fixing member 42 fixed on the cover plate 41, the fixing member 42 having a first through hole 421 and a second through hole 422, and the first through hole 421 being opposite to the pressure relief hole 411; and a gas permeable membrane 43 covering at least a portion of the pressure relief hole 411, an edge part 432 of the gas permeable membrane 43 being connected to the fixing member 42, and a portion of the edge part 432 being embedded into the second through hole 422, so as to prevent the edge part 432 from moving relative to the fixing member 42; and a mounting module configured to place the electrode assembly into the housing 30 and encapsulate the opening by using the end cover assembly 40.

It should be noted that, in the case of no conflict, the features in the embodiments of the present application may be combined with each other.

The above is only preferred embodiments of the present application, and is not intended to limit the present application. For those of ordinary skill in the art, various modifications and changes may be made to the present application. Any modification, equivalent substitution, improvement, and the like made within the spirit and principle of the present application shall fall within the protection scope of the present application.

Although the present application has been described with reference to preferred embodiments, various modifications may be made and equivalents may be substituted for parts thereof without departing from the scope of the present application. In particular, as long as there is no structural conflict, the various technical features mentioned in the various embodiments may be combined in any way. The present application is not limited to the specific embodiments disclosed herein, but includes all technical schemes falling within the scope of the appended claims.

What is claimed is:

1. An end cover assembly, comprising:
a cover plate provided with a pressure relief hole;
a fixing member fixed on the cover plate, the fixing member having a first through hole and a second through hole, and the first through hole being opposite to the pressure relief hole; and
a gas permeable membrane covering at least a portion of the pressure relief hole, an edge part of the gas permeable membrane being connected to the fixing member, and a portion of the edge part being embedded into the second through hole, so as to prevent the edge part from moving relative to the fixing member;
wherein a gap along a thickness direction of the cover plate is formed between the fixing member and the cover plate, or the fixing member has a gap along the thickness direction of the cover plate;
wherein the edge part comprises a first portion and a second portion, the first portion extends into the gap, the second portion is connected to the first portion, and the second portion is embedded into the second through hole;
wherein the fixing member comprises a top wall, a side wall and a bottom wall, the top wall and the bottom wall are provided in parallel with the cover plate, the side wall is configured to connect the top wall to the bottom wall, the top wall and the bottom wall respectively extend from the side wall in opposite directions, the first through hole is provided in the top wall, the bottom wall is fixed to the cover plate, and the gap is formed between the top wall and the cover plate;
wherein the gas permeable membrane further comprises a main body, and the edge part is formed at a periphery of the main body;
wherein the edge part further comprises a third portion, the third portion covers one side of the top wall away from the gap, and the second portion connects the first portion to the third portion.

2. The end cover assembly according to claim 1, wherein there are a plurality of the second through holes, and the plurality of the second through holes are provided at intervals around the first through hole.

3. The end cover assembly according to claim 1, wherein a penetration direction of the second through hole is not perpendicular to a thickness direction of the cover plate.

4. The end cover assembly according to claim 1, wherein the second through hole is provided in any one of the top wall, the side wall and the bottom wall.

5. The end cover assembly according to claim 1, wherein the first portion and the third portion are both connected to the main body.

6. The end cover assembly according to claim 1, wherein the third portion is provided with a third through hole, and the third through hole is staggered from the second through hole.

7. The end cover assembly according to claim 1, wherein the fixing member comprises a top wall, a side wall and a bottom wall, the top wall and the bottom wall are provided in parallel with the cover plate, the side wall is configured to connect the top wall to the bottom wall, and the top wall and the bottom wall respectively extend from the side wall in a same direction; and
the first through hole penetrates through the top wall and the bottom wall, and the gap is formed between the top wall and the bottom wall.

8. The end cover assembly according to claim 1, wherein the gas permeable membrane is made of a polymer material and the fixing member is made of a metal material.

9. The end cover assembly according to claim 8, wherein the gas permeable membrane is molded on the fixing member by injection molding.

10. The end cover assembly according to claim 1, wherein the end cover assembly further comprises:
a sealing member provided between the gas permeable membrane and the cover plate to seal a slit between the gas permeable membrane and the cover plate, or provided between the gas permeable membrane and the fixing member to seal a slit between the gas permeable membrane and the fixing member.

11. The end cover assembly according to claim 1, wherein the gas permeable membrane is configured to be actuated when an internal pressure or a temperature of a battery cell reaches a threshold value, so as to release the internal pressure of the battery cell.

12. A battery cell, comprising a housing, an electrode assembly and the end cover assembly according to claim 1, wherein the housing has an opening, the electrode assembly is located within the housing, and the end cover assembly encapsulates the opening.

13. A battery comprising the battery cell according to claim 12.

14. An electric device comprising the battery according to claim 13.

* * * * *